United States Patent
Koren et al.

(10) Patent No.: US 8,570,987 B2
(45) Date of Patent: Oct. 29, 2013

(54) STAND ALONE WIMAX SYSTEM AND METHOD

(75) Inventors: Ofir Koren, Kadima (IL); Kobi Ovadya, Ein Sarid (IL); Michael Gilin, Ashdod (IL)

(73) Assignee: Ruggedcom Ltd. (IL)

(*) Notice: Subject to any disclaimer, the term of this patent is extended or adjusted under 35 U.S.C. 154(b) by 235 days.

(21) Appl. No.: 13/156,527

(22) Filed: Jun. 9, 2011

(65) Prior Publication Data

US 2012/0213085 A1 Aug. 23, 2012

(30) Foreign Application Priority Data

Feb. 18, 2011 (CA) .................................... 2732181

(51) Int. Cl.
*H04J 3/00* (2006.01)
*H04W 4/00* (2009.01)
*H04B 7/212* (2006.01)
*H04L 12/28* (2006.01)
*H04L 12/56* (2011.01)

(52) U.S. Cl.
USPC ........... 370/337; 370/329; 370/347; 370/390; 370/442

(58) Field of Classification Search
USPC ......... 370/328, 329, 336, 337, 345, 347, 390, 370/442
See application file for complete search history.

(56) References Cited

U.S. PATENT DOCUMENTS

| 2002/0061748 | A1* | 5/2002 | Nakakita et al. | 455/435 |
| 2004/0037237 | A1* | 2/2004 | Lalwaney | 370/320 |
| 2006/0034438 | A1* | 2/2006 | O'Neill | 379/114.07 |
| 2010/0159885 | A1* | 6/2010 | Selgert et al. | 455/412.1 |

\* cited by examiner

*Primary Examiner* — Ronald Abelson

(57) ABSTRACT

A WiMAX based system having a base station which communicates to a plurality of consumer premises equipment (CPE) is disclosed. The base station obtains and stores information corresponding to the MAC addresses of each CPE. Messages from one CPE can be sent to the base station and then sent to another CPE using the MAC address stored in the base station. Each CPE may originate an uplink multicast message for transmission to more than one CPE. When the base station receives the uplink multicast message, it broadcasts the multicast message to all of the CPEs identified in the multicast message including the originating CPE. When the originating CPE recognizes the multicast message as a message it originated, the originating CPE drops the multicast message. The CPEs may be grouped into virtual local area networks (VLANs) using group identifiers which permit multicast messages to be transmitted to specific groups of CPEs.

27 Claims, 10 Drawing Sheets

| Index | MAC address | VLAN | ... | Aging Time (s) | CPE MAC address | Interface |
|---|---|---|---|---|---|---|
| 1 | 00:1D:60:FE:F3:36 | 200 | ... | 512 | 00:13:D5:01:01:5A | RF |
| 2 | 00:3E:50:F1:F2:F3 | 300 | ... | 234 | 00:13:D5:01:02:D6 | RF |
| ... | | | ... | | | |
| 11 | 00:22:15:D5:22:01 | 1000 | ... | 800 | N/A | Network |
| 12 | 00:21:D7:F3:B7:90 | 200 | ... | 341 | 00:13:D5:01:01:5A | RF |
| ... | | | ... | | | |
| 35 | 00:13:D5:01:01:88 | N/A | ... | 125 | N/A | Local |
| 36 | 00:22:02:D5:A3:07 | 900 | ... | 256 | N/A | Network |
| ... | | | ... | | | |

Figure 3

STAND ALONE WIMAX SYSTEM AND METHOD

CROSS-REFERENCE TO RELATED APPLICATIONS

This application claims the benefit under 35 U.S.C. 119 of Canadian patent application 2,732,181 filed on Feb. 18, 2011.

FIELD OF THE INVENTION

This invention relates to wireless networks. More specifically, this invention relates to a wireless network implementing the Worldwide Interoperability for Microwave Access (WiMAX) standard.

BACKGROUND OF THE INVENTION

A wireless network is a common type of computer network that incorporates two or more devices capable of communicating wirelessly. The prevalence of wireless devices has grown exponentially with the adoption of mobile phones and other types of personal and consumer electronics, i.e. smart phones, tablets, netbooks, laptop computers and other wireless electronic devices.

The growth of wireless networking has grown in parallel with the adoption of Wi-Fi™, the series of wireless local area network (wireless LAN/WLAN) protocols based on the series of Institute of Electrical and Electronics Engineers (IEEE) 802.11 standards. The adoption of Wi-Fi™ has allowed LANs to be deployed economically without the need to run cables, reducing costs and increasing flexibility. Furthermore, high adoption has increased the appetite for wireless data and created a market for faster networks with increased speed and capacity.

Worldwide Interoperability for Microwave Access (WiMAX) is a next generation wireless protocol introduced by the WiMAX Forum. WiMAX refers to a specific type of the series of interoperable IEEE 802.16 standards which are incorporated herein by reference. WiMAX offers increased speeds and improved range over WLANs utilizing Wi-Fi™, and supports fixed, nomadic and mobile deployments. Furthermore, companies have employed the standard to provide mobile broadband across large geographical areas and to compete with third generation mobile technologies, such as Global System for Mobile Communications (GSM) and Code Division Multiple Access (CDMA). WiMAX is often considered as an economical alternative to last mile Internet access currently served by cable or digital subscriber lines (DSL). The flexible bandwidth allocation and multiple built-in types of Quality-of-Service (QoS) support in the WiMAX network allow for deployments that include high-speed Internet access, Voice Over Internet Protocol (VoIP) and video calls, multimedia chats and mobile entertainment.

The IEEE 802.16 series of standards provide the air interface for a number of wireless communication standards, but does not necessarily define a standard WiMAX network. However, the WiMAX Forum's Network Working Group (NWG) has identified a standard set of end-to-end requirements, architecture and protocols for WiMAX, using IEEE 802.16e-2005 as the air interface. According to a WiMAX standard, the overall network may be logically divided into three parts: Consumer Premises Equipment (CPE), the Access Service Network (ASN) and the Network Operations Centre (NOC).

Consumer Premises Equipment (CPE) are devices used by the end user to access the WiMAX network. In fixed deployments, the CPE may be a WiMAX access point used to provide users with access to the WiMAX network through standard fixed or wireless LANs (e.g. using Wi-Fi™). In other embodiments, the CPE may be a mobile phone, a computing device or the like, able to access the WiMAX network directly when in range of a base station.

A Network Operations Centre (NOC) provides connectivity to the Internet, Application Service Providers (ASP), other public networks, and corporate networks. According to conventional WiMAX networks, the NOC also includes Authentication, Authorization and Accounting (AAA) servers that support authentication for the devices, users, and specific services. The NOC also provides user policy management of QoS and security and NOC is also responsible for IP address management, support for roaming between different NSPs, location management between ASNs, and mobility and roaming between ASNs. As WiMAX was developed at least in part to support the next generation of mobile devices, the NOC is also capable, in some implementations, of communicating with the Public Switched Telephone Network (PSTN) and $3^{rd}$ Generation Partnership Projects (3GPP/3GPP2) via a Gateway and integrating Operations Support Systems (OSS) and Business Support Systems (BSS) within the NOC environment.

In prior art WiMAX architectures, communication between an ASN and both the CPEs and NOC is segregated. On the subscriber side, the ASN is operable to communicate with the CPEs using a base station. On the network side, communication between the NOC and the ASN occurs through an ASN Gateway (ASNGW). Data received at the ASN from a CPE via a base station will be passed to the ASNGW for proper message forwarding. The ASNGW of the prior art devices may communicate with the NOC to retrieve message forwarding instructions. As an ASN may cover a large geographic area, multiple base stations may be grouped within a single ASN, with one or more ASNGWs managing and tracking the flow of data amongst several base stations which may create unpredictable latency.

The WiMAX standard supports both Frequency Division Duplexing (FDD) and Time Division Duplexing (TDD), although the widely deployed WiMAX Release 1 based on IEEE 802.16e technology only supports TDD as the duplexing mode. In any event, TDD is better positioned for mobile Internet devices where data transmission is asymmetrical.

TDD provides full duplex communication over a communication link applying time-division multiplexing (TDM). This form of implementation is simpler and cheaper than one utilizing FDD, as transceiver designs for TDD implementations are less complex and therefore less expensive. The uplink and downlink data rates between BS and CPE are managed by the scheduling algorithm, which allocates recurrent timeslots. Outbound transmissions from the BS are broadcast in addressed frames. Each CPE can then pick off those frames addressed to it. Accordingly, the dynamic allocation of traffic over a single communication link can be optimized based on load usage. In other words, capacity can be added or taken away from specific CPEs as the traffic loads fluctuate.

In conventional WiMAX networks, the base station (BS) will control access to the channel. Users wishing to transmit inbound to the BS must first send a request on a contention-based access channel. Exclusive permission to use the inbound traffic channel is then allocated by the BS using a system of transmission grants. Each CPE is allocated a transmission slot in time-frequency domain, thus there are no collisions.

Multicast is a form of one-to-many distribution. With similarities to broadcasting, multicasting allows a source to transmit a message to many receivers simultaneously. However, a difference between broadcasting and multicasting is that multicasting may limit the pool of receivers to those that are identified as part of the receiver group.

Multicasting is used in situations where a message needs to be sent to many receivers from a single transmission source. Instead of individually packaging a message for each individual receiver, the transmission source utilizing multicasting may send the message once. Common applications for multicast include the deployment of streaming media, such as Internet radio and television programs.

However, the prior WiMAX networks suffer from the disadvantage that any CPE-to-CPE multicast transmissions must be managed by and routed from the Access Network even for the CPEs that are behind the same Base Station.

SUMMARY OF THE INVENTION

Accordingly, it is an object of this invention to at least partially overcome some of the disadvantages of the prior art. Accordingly, it is an object of this invention to provide an improved type of WiMAX based system and method which stands alone, decreases message transmission latency and facilitates multicast transmissions initiated by an originating CPE and to be broadcast to all of the CPEs or a predefined group of the CPEs.

Accordingly, in one of its aspects, this invention resides in a wireless communication system comprising: a plurality of consumer premises equipments (CPEs) for sending and receiving wireless signals in a first communication standard using time division multiplexing (TDM), each CPE having a unique MAC address; a base station having a wireless port for sending and receiving wireless signals to each of the plurality of CPEs in the first communication standard and using TDM, said base station having stored therein a look-up table containing the MAC addresses of each of the plurality of CPEs; wherein any one of the plurality of CPEs can uplink a multicast message to the base station to be sent to the CPEs; and wherein in response to receiving the uplink multicast message, the base station sends a downlink multicast message to the CPEs having their MAC addresses stored in the look-up table and identified in the uplink multicast message.

A further aspect of the invention resides in a method of wirelessly communicating multicast messages between a plurality of consumer premises equipment (CPEs) in a first communication standard using Time Division Multiplexing (TDM), each of said CPEs having a unique MAC address, said method comprising: sending, from an originating CPE of the plurality of CPEs, an uplink multicast message to a base station, said base station having a wireless port for sending and receiving wireless signals to each of the plurality of CPEs in the first communication standard and using TDM, said base station also having stored therein a look-up table containing the MAC addresses of each of the plurality of CPEs; receiving, at the base station, the uplink multicast message; converting, at the base station, the uplink multicast message to a downlink multicast transmit message using the look-up table stored at the base station; and transmitting, by the base station, the downlink multicast message to the CPEs having their MAC addresses stored in the look-up table and identified in the uplink multicast message.

Accordingly, one advantage of at least one aspect of the present invention is a base station capable of reducing end-to-end latency. By storing information pertaining to a Consumer Premises Equipment (CPE) at the base station, the base station is capable of redirecting wireless traffic received from one CPE to second CPE without having to resort to forwarding the message to a Network Operations Center (NOC) and/or Access Network or otherwise receive additional routing information. In this way, messages received from the first CPE can be retransmitted to the second CPE immediately without the use of a router, reducing end-to-end latency and network resources.

In a further aspect of the present invention, the present invention provides that a CPE can uplink a multicast message over a WiMAX network. In this way, individual CPE's can access the one-to-many communication channel allowing multicast messages to other CPE's by indicating a message as a multicast message when uploading to the WiMAX base station. Messages labeled as multicast messages will then be forwarded by the base station to the appropriate multicast group using information stored at the base station.

In a further aspect, the base station will transmit the multicast message to all of the CPEs in the designated group, including the CPE that initiated the multicast message. When the originating CPE recognizes the multicast message as one that it originated, the originating CPE will drop the multicast message. This improves overall efficiency of the wireless system and decreases bandwidth and processing time.

A further advantage of the present invention is the ability to form Virtual Local Area Networks amongst end users of a WiMAX network in a simple and cost effective manner. By accessing the information stored within a base station, the base station is capable of rerouting messages to VLAN members without having to resort to IP-tunneling or other more convoluted techniques. In this way, access and security of VLANs can be managed simply and effectively by a base station. CPEs can be grouped logically into a single broadcast domain. Further, broadcast traffic can be confined to specific VLAN members only, resulting in increased security and a reduction of traffic to the rest of the network.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 3 is a look-up table for a base station in accordance with an embodiment of the present invention;

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Preferred embodiments of the invention and its advantages can be understood by referring to the present drawings. In the present drawings, like numerals are used for like and corresponding parts of the accompanying drawings.

Figure 1:
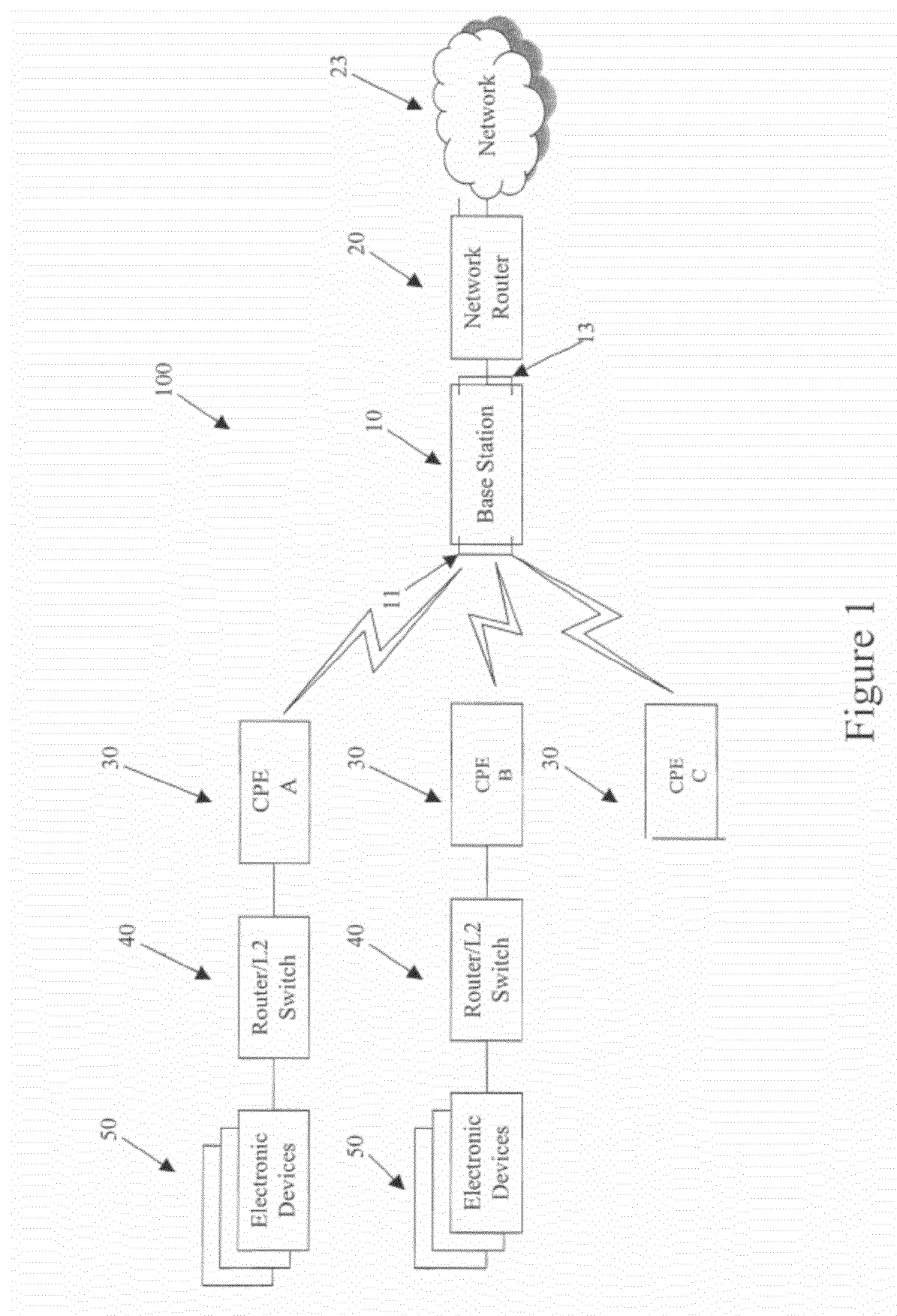
FIG. 1 is a network diagram of a wireless communication system in accordance with an embodiment of the present invention.

As shown in FIG. 1, one embodiment of the present invention relates to a wireless communication system shown generally by reference numeral 100, having a base station 10 and one or more consumer premises equipment (CPEs) 30. The base station 10 may be further connected to a backhaul network shown generally by reference numeral 23 through a network router or switch 20.

The base station 10 communicates with each of the CPEs 30 wirelessly through a first communication standard incorporating a time division multiplexing (TDM) organizational scheme. For example, the first communication standard may include a wireless communication standard based on the series of IEEE 802.16 (WiMAX) standards. More preferably, the first communication standard may be based on the IEEE 802.16 standard defined by the 802.16-2009 amendment (IEEE 802.16E). The series of IEEE 802.16 standards are hereby incorporated by reference in their entireties.

In at least one embodiment, the CPEs 30 may be end-user devices shown, for example, by CPE "C" 30. For example, the CPE "C" 30 may be a mobile device, a computer, or the like, communicating with the base station 10 directly over the WiMAX communication channel.

In alternate embodiments, the CPEs 30 may be considered wireless access points shown, for example, by CPEs "A" and "B" in FIG. 1. The CPEs 30 may be operable to share the communication channel to the base station 10 with one or more electronic devices 50 connected to the CPE 30 via a local router or layer 2 (L2) switch (e.g. router/L2 switch 40). Furthermore, the router/L2 switch 40 may be wired or wireless, communicating with the electronic devices 50 over one of various communication standards, such as IEEE 802.3 (Ethernet), IEEE 802.11 (Wifi), 802.1Q, Bluetooth™, other 802.15 Wireless PAN standards, and the like. In a preferred embodiment, the base station 10 may be connected to a CPE 30 acting as a wireless access point, sharing the communication channel implemented in WiMAX with one or more associated mobile devices, computing devices, printers, and the like, over a Wifi or Ethernet connection. Connectivity to the internet, or other network resources, by the electronic devices 50 may be routed through the CPE 30, over the communication channel and to the internet via the base station 10.

The base station 10 may be further connected to further network resources (not shown), through a network router or switch 20 to the backhaul network 23. In some embodiments, the base station 10 is connected to the router 20 by a wired port 13. While other standards are possible, the connection to the network router 20, and to the other network resources, may occur over the IEEE 802.3 (Ethernet) and IEEE 802.1Q (VLAN Tagging) standard.

Figure 2:
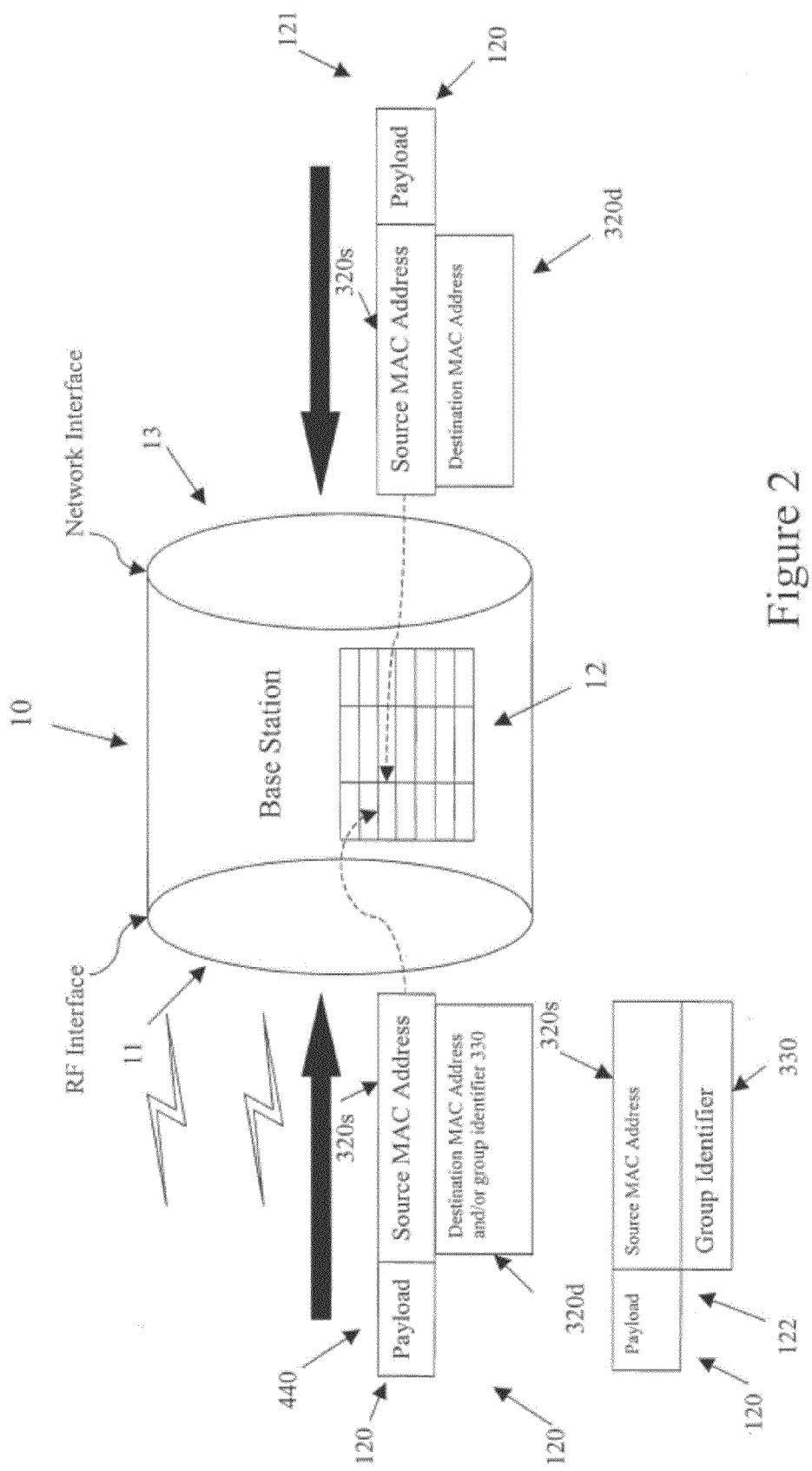
FIG. 2 is a schematic illustration of the message routing behaviour of a base station in accordance with an embodiment of the present invention.

Referring now to FIG. 2, the base station 10 is operable to learn about the CPEs 30 and the electronic devices 50 via the messages 120 sent over the communication channel. As messages 120 are sent to base station 10 by the CPE 30, or by the electronic devices 50 via the CPE 30, the base station 10 identifies the individual CPE 30 or electronic device 50, by its unique Media Access Control (MAC) address 320s. The base station 10 stores this information in a look-up table 12. For example, as messages 120 are sent by the base station 10 from either the CPE 30 or the network router 20, the MAC address of the sender or source 320s is logged and placed into the look-up table 12 stored on the base station 10.

The base station 10 is then operable to send or forward the message 120 to its intended recipient identified by the destination MAC address 320d in the message 120. The message 120 received by the base station 10 may be sent as a unicast message 120, a multicast message 122 or a broadcast message to one or more of the plurality of CPEs 30 and electronic devices 50 of wireless communication system 100, accessible to the base station 10.

A unicast message 121 is destined for a specific CPE 30 or electronic device 50. The originator of the unicast message 121 may include a unique identifier such as a destination MAC address 320d to specify the recipient of the unicast message.

A multicast message 122 is destined for a subset of the CPEs 30 and electronic devices 50 accessible to the base station 10. The base station 10 may include or act upon a group identifier 330 or VLAN included with the multicast message 122 and/or stored on the base station 10 to forward the multicast message 122, to the proper recipients. In this case, instead of a single destination MAC address 320d, the multicast message 122 may have a plurality of destination MAC addresses 320d, or, a group identifier 330 which identifies a group of devices 50 in the look-up table 12.

A broadcast message, also known as broadcast flooding, forwards the message to all the CPEs 30 and electronic devices 50 accessible to the base station 10. The base station 10 may forward uplink broadcast message based on information stored on the base station 10, such as on the look-up table 12.

Referring now to FIG. 3, a look-up table 12 is depicted in one preferred embodiment. It should be understood that other look-up tables are possible and the description and construction of the look-up table 12 herein should not be construed as limiting.

In a preferred embodiment, the look-up table 12 is stored within the base station 10. It may be referred to by the base station 10 in order to determine how to forward a received message 120. In some embodiments, the base station 10 may act on a received message 120 according to information from either the originator of the message (i.e., either a CPE 30 or an electronic device 50), or its recipient, based on information stored within the look-up table 12.

Information stored within the look-up table 12 may include different fields necessary to allow the base station 10 to forward a message 120 effectively without requiring further information from the network router 20. For example, the look-up table 12 may include an index 310 to keep track of the different devices 30, 50 utilizing the base station 10 to forward messages 120. The different devices 30,50 may then be associated with their corresponding MAC addresses 320 and a group identifier 330 which, in one preferred embodiment, may potentially be a Virtual Local Area Network (VLAN). Further, if the device is an electronic device 50 associated with a CPE 30, the look-up table 12 may also associate the electronic device 50 with both its device MAC address 320 and the associated CPE MAC address 350.

Each device 30, 50 may be stored as a separate device entry 302 in the look-up table 12. For example, the device entry 302A associated with the index 1 has a device MAC address 320 of 00:1D:60:FE:F3:36. Further, the device entry 302A is associated with a group identifier 330 (or VLAN) identified as "200" and a CPE MAC address 350 of 00:13:D5::01:5A.

Other device entries 302B, 302C store information specific to a specific device. If a device does not have a value for a field stored within the look-up table 12 (e.g. an associated CPE MAC address 350 for device entry 302C because that entry 302C may be for a router on the network side 20), the CPE field 350 may be left blank or otherwise identified as not having a stored value.

The interface field 360 may store the relationship between the base station 10 and device entry 302. For example, the base station 10 may store that the relationship between the base station 10 and a specific device entry 302B is over the wireless communication standard (indicated in the interface field 360 as "RF"). Other network interface indicators are possible, such as for example, "network" meaning over network 23 and "local" meaning packets that originate from the base station 10 itself, such as management packets.

Other fields may also be stored by the look-up table 12, such as aging time field 340 and the like. The aging time field 340 may update how long the base station 10 has gone since a message 120 was received from a particular device stored in its look-up table 12. In some embodiments, the base-station 10 may purge device entries 302 from the look-up table 12 if a new message 120 is not received from a particular device 30, 50 within a specified aging time 340. As described, any number of fields may be stored in the look-up table 12 to improve the efficiency and forwarding capabilities of the base station 10.

Figure 4:
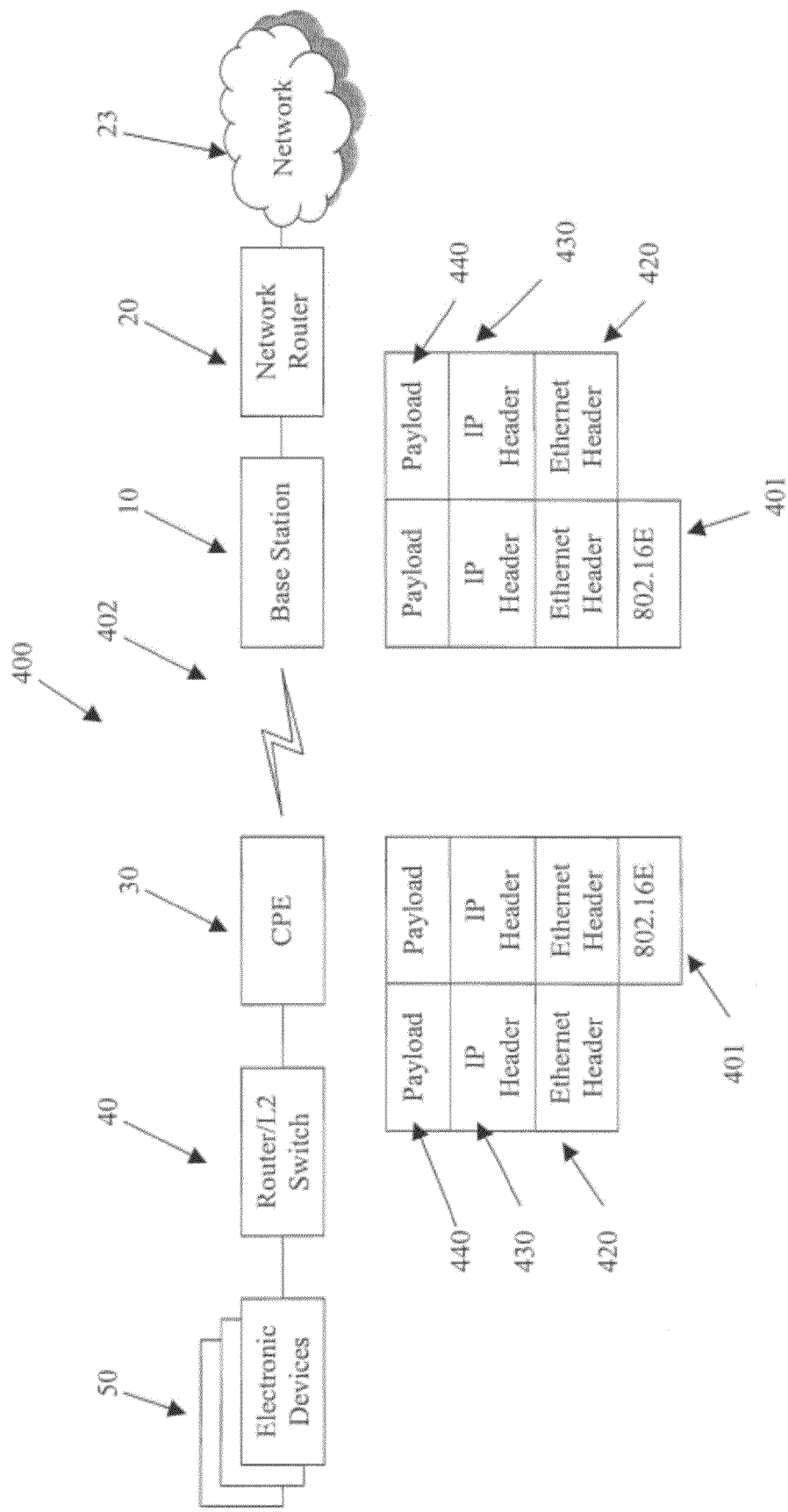
FIG. 4 is a network packet diagram illustrating the encapsulation of a network frame in accordance with an embodiment of the present invention.

Referring now to FIG. 4, the base station 10 is operable in the Ethernet Convergence Sublayer (Ethernet-CS) mode according to one embodiment of the present invention. In the configuration illustrated in FIG. 4 shown generally by reference numeral 400, non-IP protocols are supported. In this mode, messages received at the base station 10 for communication to an electronic device 50 associated with a particular CPE 30, and messages received at a CPE 30 for transmission over the network via the base station 10, are encapsulated by the first communication standard (i.e. the WiMAX group of standards such as, preferably, IEEE 802.16E) for transmission over the wireless communication channel, shown generally by reference numeral 402.

In Ethernet-CS mode, neither the base station 10 nor the CPEs 30 reply to Address Resolution Protocol (ARP) requests, but instead pass all traffic through to its intended recipient. In addition, the base station 10, and the CPE 30 if acting as an access point, is operable to learn the source MAC addresses of all incoming packets from the Ethernet header 420. The base station 10 may then store the source MAC address information in its look-up table 12 as discussed above.

Figure 5A:
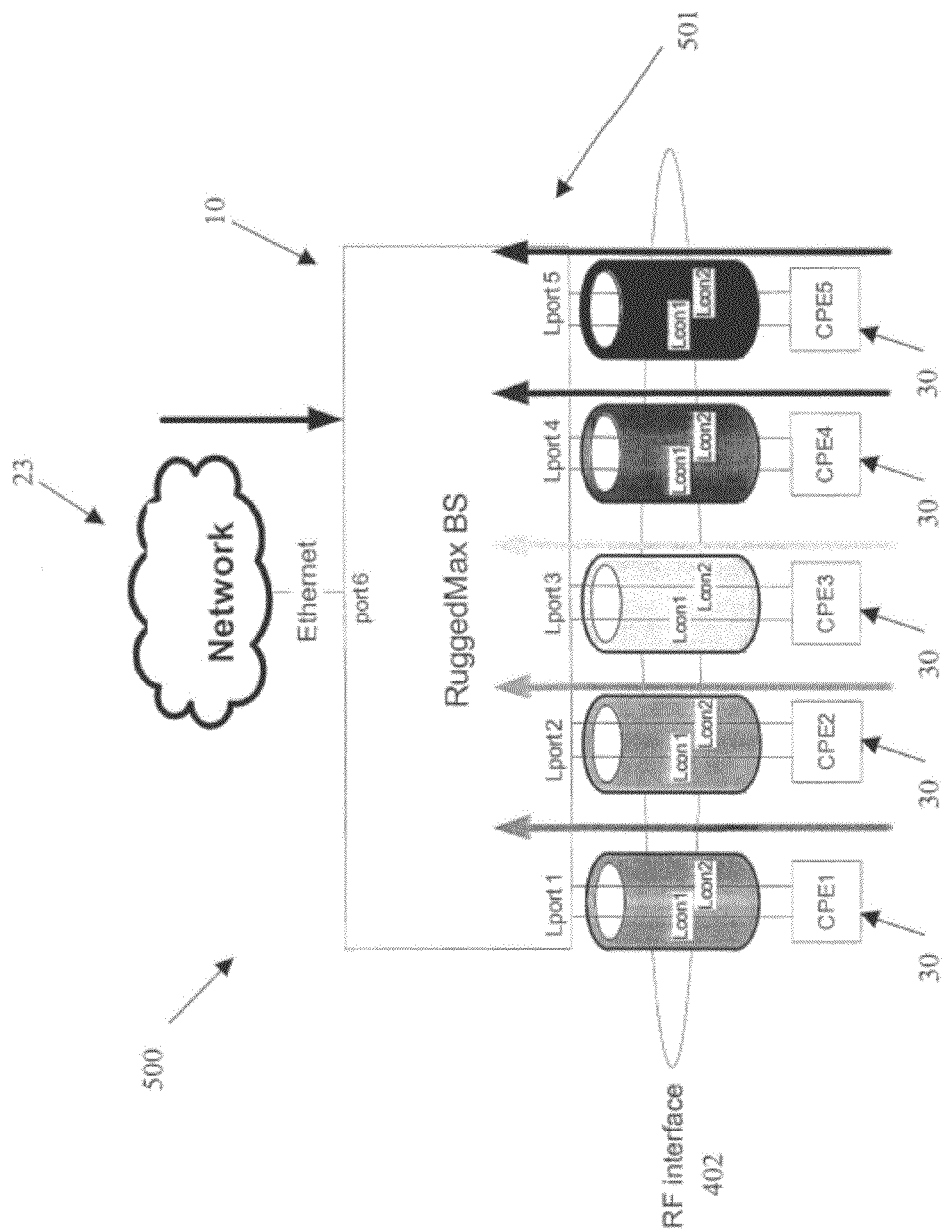
FIG. 5A is a routing diagram of a base station in accordance with an embodiment of the present invention.

Referring now to FIG. 5A, the base station 10 may be operable to behave as an L2 switch shown schematically in configuration 500. While the base station 10 sends and receives messages from the CPEs 30 over a single RF Interface (e.g., according to time division duplexing or frequency division duplexing), the base station 10 can associate each CPE 30 with a logical port 510 identified, for example, as Lport1, Lport2, Lport3, Lport4, Lport 5. Logical ports 501 may be used to provide radio connectivity to the CPEs 30. Each logical port Lport1, Lport2, Lport3, Lport4, Lport 5 may have a number of logical connections 520 identified, for example, as Lcon1, Lcon2 per CPE 30 that are used to forward traffic over the air. Each logical connection Lcon1, Lcon2 may have a different Quality of Service (QoS), so as to enable the base station 10 to maintain priority between different applications using the shared air medium in this case, the radio frequency (RF) interface identified generally by reference numeral 402. For example, different QoS may be required for specific types of applications undertaken by the wireless communication system 100, such as for real-time multimedia applications and other applications requiring fixed bit-rate or which are delay sensitive.

When the base station 10 receives a message from either the RF Interface or Network Interface, the base station 10 identifies the source MAC address 320s of the incoming packet. If the MAC address is unknown to the base station 10, the base station 10 is operable to create a new entry for the device associated with the source MAC address in the look-up table 12, before forwarding the message to its intended target. Accordingly, the base station 10 populates the look-up table 12 with MAC addresses identifying CPEs receiving and sending messages in the first communication standard. If the source MAC address is already included within the look-up table 12, the base station 10 may forward the message without creating a new entry. However, in some embodiments, the base station may first verify and/or update one or more fields associated with the known MAC address, such as for example, updating the aging time field 340.

Returning to the example depicted in FIG. 4, an IP packet may be sent by an electronic device 50 to the CPE 30 for transmission to the base station 10. From a forwarding point of view, the CPE 30 encapsulates the whole Ethernet frame and sends it to the base station 10 using the IEEE 802.16E wireless interface shown by reference numeral 401. Once the base station 10 has received the message, the base station 10 strips off the 802.16E header and then forwards the frame to the network or to another CPE (not shown) according to the destination MAC address provided in the Ethernet header 420 and IP header 430 of the encapsulated massage 401.

At the base station 10, each incoming packet has to be checked against the look-up table 12 before being forwarded. If the destination MAC address is in the look-up table 12, the base station 10 will forward the packet according to the destination MAC address. If the destination MAC address is not in the look-up table 12 or the packet is a broadcast packet, the base station 10 will perform broadcast flooding of the packet to all the CPEs 30 and/or network 23 through the network router 20. This behaviour is similar to the behaviour of an L2 switch. It can be implemented efficiently in the TMD scheme of the first communication standard, in order to save the short over-the-air (OTA) resources.

In a preferred embodiment, the base station 10 has two main functions with regards to scheduling. These include deciding which logical port LPORT 510 is served before the other and how much traffic will be sent out. Traffic prioritization in the base station 10 can be done using a number of mechanisms. In a preferred embodiment, the base station 10 uses two potential mechanisms. The first mechanism involves a strict priority. In this mechanism, the highest priority traffic is served before any low priority traffic. Priorities are given based on the logical port 510 and the logical connection 520 for each of the CPEs 30. In the second mechanism, weighted-fare priority may be used. In this mechanism, the band width across the radio frequency interface 402 is shared relatively according to the weight given to different logical ports 510. For example, if there are two logical connections on a particular logical port, one with weight 2 and the other with weight 1, the first may have two-thirds of the available bandwidth and the second may have one-third of the available bandwidth. How much traffic is sent on each logical connection 520 of each logical port 510 is determined by the committed information rate (OR) and the maximum information rate (MIR) that are defined by the logical connection 520.

In the case of multicast connections, each multicast connection has a configurable traffic priority. Thus, for each VLAN communication, traffic can be prioritized over other VLAN traffic. It may also be prioritized over unicast downlink traffic.

Figure 5B:
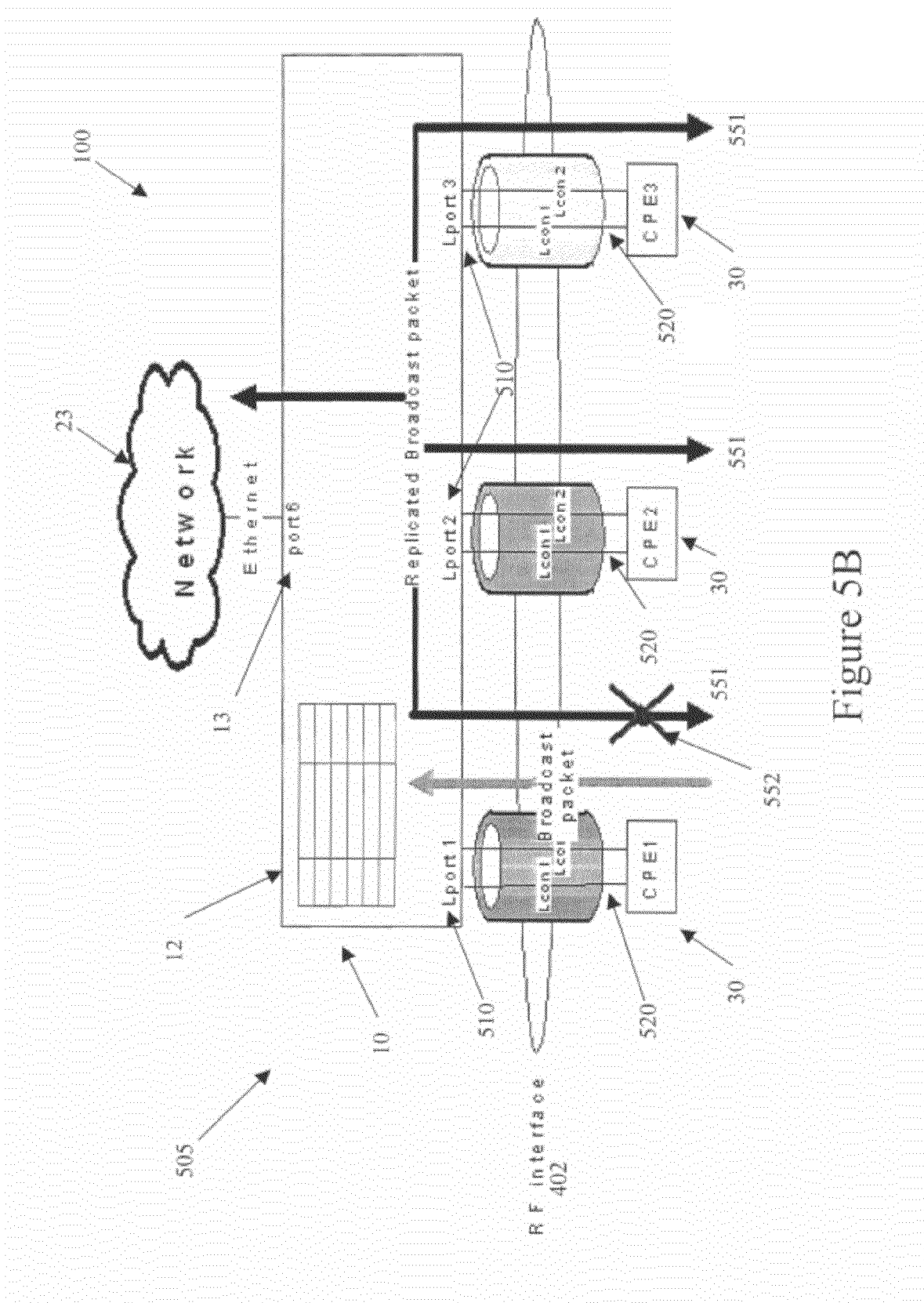
FIG. 5B is a routing diagram of a base station in accordance with a further embodiment of the present invention.

FIG. 5B shows a further preferred embodiment of the present invention. As illustrated in FIG. 5B, a configuration 505 of the system 100 has a base station 10 sending and receiving data to the CPEs 30. In one case, the CPE1 sends a broadcast packet 550 through the first logical port Lport1 to the base station 10. The broadcast packet 550 is then replicated and broadcast back as packet 551. It is noted that because the CPEs utilize the shared radio frequency interface 402, to keep the bandwidth low and increase the efficiency of the system, the pack is not replicated N−1 times for each of the CPEs in order to exclude the originating one. Rather, the replicated return broadcast packet 551 is sent once over the broadcast connection to all of the CPEs 30. It is then incumbent on the originating CPE 30, in this case CPE1, to drop the returned packet 551. This is schematically illustrated, for instance, by the X identified by reference numeral 552 in FIG. 5B next to originating CPE1. This efficient treatment of transmitting one return packet 551 simultaneously to all of the CPEs and then having the originating CPE recognize that it was the originator of the packet 550 and dropping the return packet 551, saves processing time by the base station 10 and also saves bandwidth over the shared radio frequency interface 502. The originating CPE simply drops the return packet 551 in order to avoid wrong learning or out of date learning and thus, lack of communication. The incremental additional processing by the originating CPE 30 is minor in comparison to the increase in the bandwidth over the shared interface 402 and also the decrease in processing time by the base station 10.

Furthermore, while this approach can be used with broadcast messages, it can also be used with multicast messages which designate a group of CPEs which include the originating CPE, such as in a common VLAN. Therefore, the embodiment illustrated in FIG. 5B is considered non-limiting and could apply to multicast messages to groups of CPEs 30 or device 50 connected to CPEs in different VLANs. It is also understood that while the originating device in FIG. 5B is shown to a CPE 30, the invention is not limited in this regard and a device (not shown) connected to a CPE 30 could have originated the packet 550.

Figure 6A:
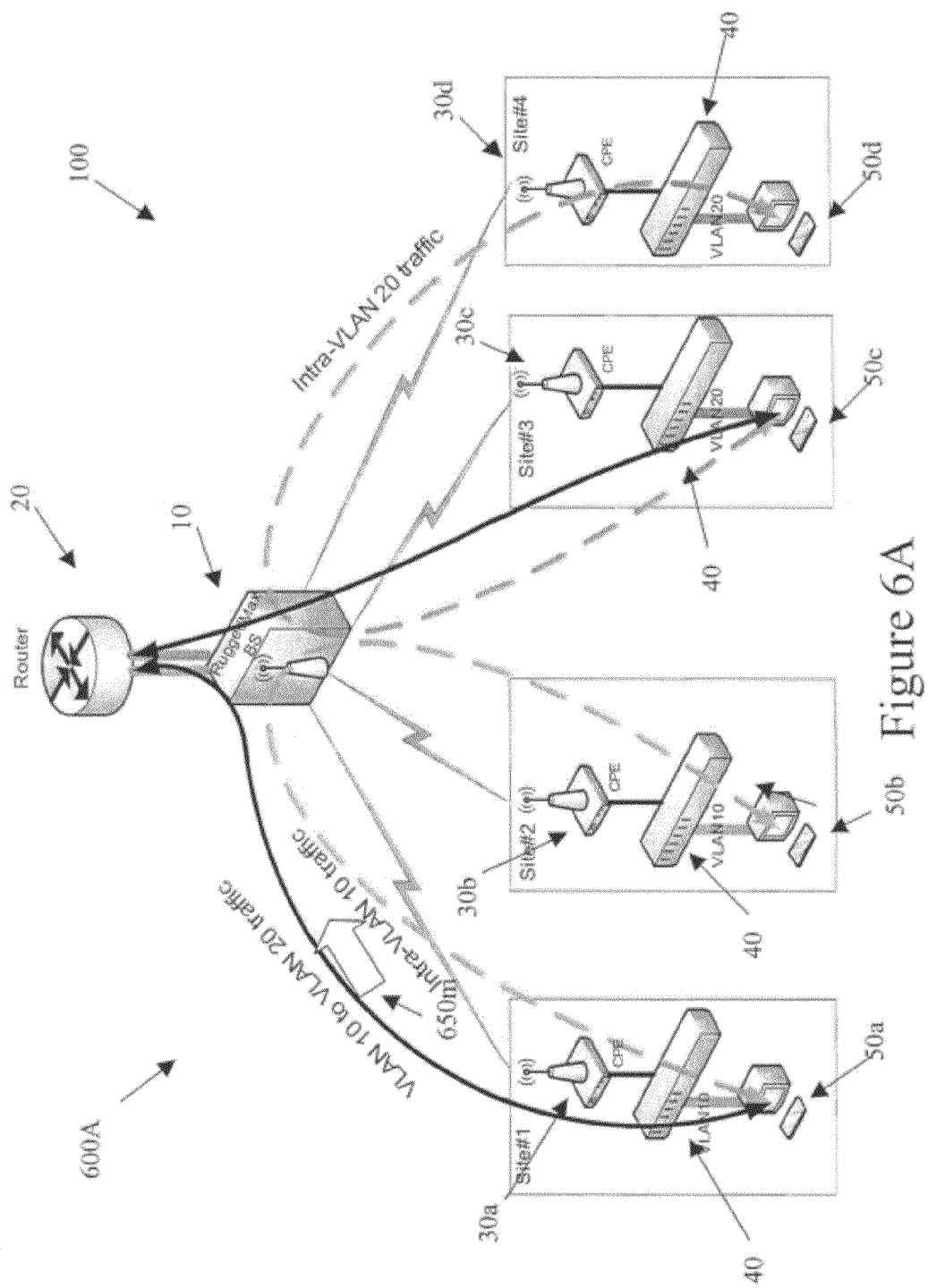
FIG. 6A is an illustration of a network topology for a wireless communication system in accordance with an embodiment of the present invention.
Figure 6B:
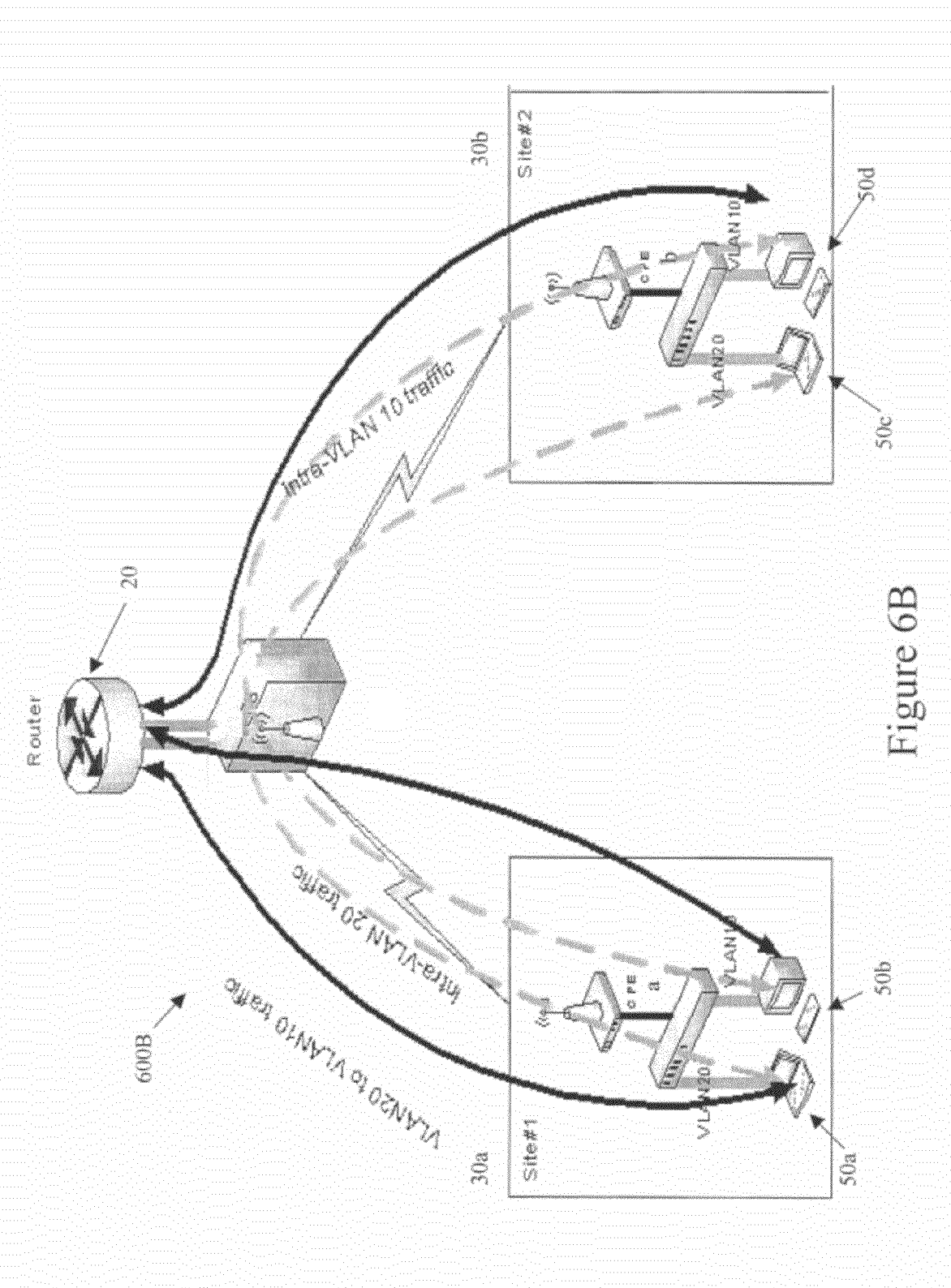
FIG. 6B is an illustration of a network topology for a wireless communication system in accordance with another embodiment of the present invention.
Figure 6C:
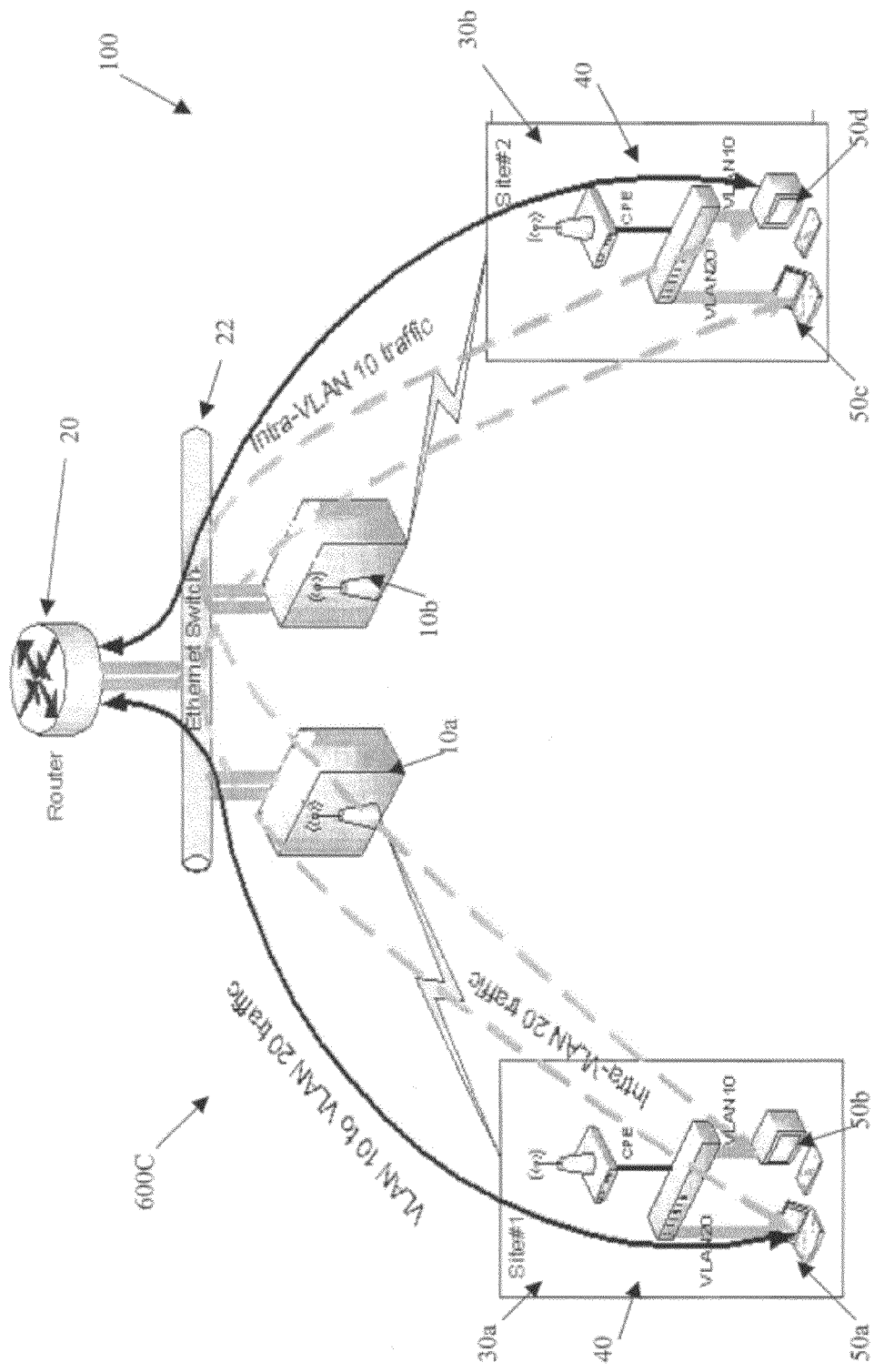
FIG. 6C is an illustration of a network topology for a wireless communication system in accordance with another embodiment of the present invention.

Referring now to FIG. 6A, FIG. 6B and FIG. 6C, the wireless communication system 100 is depicted according to at least three topologies 600A, 600B and 600C. The network topologies 600A, 600B and 600C in the present embodiments should not be construed as limiting. In FIG. 6A, the system 100 has a topology 601 with the base station 10 connected to one or more CPEs 30, the individual CPEs 30 depicted as 30A, 30B, 30C and 30D. Each CPE 30A, 30B, 30C, 30D has at least one electronic device 50 associated therewith. The MAC addresses of each of the electronic devices 50, depicted as 50A, 50B, 50C, 50D, and their associated CPEs 30 is stored in the base station 10 within the look-up table 12 as discussed above. Furthermore, the base station 10 may also store group identifier information, such as Virtual Local Area Network (VLAN) information. In some embodiments, the group identifier 330 may be stored within the look-up table 12 containing MAC address information, also stored in the base station 10.

When a message shown generally by reference numeral 650m is sent from any electronic device 50A, the base station 10 is operable to forward the message 650m to its intended target, without accessing the network router 20, if the base station 10 recognizes the intended recipient(s) and has the information stored in the look-up table 12. If the base station 10 recognizes the intended recipient to be on the network side, the base station 10 may forward the message 650m to the network router 20 to perform routing. If the recipient of the message is not recognized, the base stations 10 may flood the packet towards the router 20 and the rest of the CPEs based on the mechanism described in FIG. 5B. FIG. 6A, FIG. 6B, and FIG. 6C depict various forms of routing according to at least some aspects of the present invention. It should be understood that other embodiments are possible, with the present embodiments not construed as limiting.

By way of example, FIG. 6A illustrates the network topology 600A of a wireless communication system 100 in at least one embodiment. The electronic device 50A associated with the CPE 30A is operable to send a unicast message to the electronic device 50B associated with the CPE 30B. The electronic device 50A first sends an IP-based message to the router/L2 switch 40A over a second communication standard, such as for example, an Ethernet connection. The router/L2 switch 40A then forwards the message to the CPE 30A. Once received, the originating CPE 30A then encapsulates all of the Ethernet frame of the message and uplinks a unicast message to the base station 10 including the MAC address of the target electronic device 50B. The base station 10 then strips the wireless header, in a preferred embodiment a 802.16E header, and forwards the message. If the base station 10 recognizes from its look-up table 12 that the intended target (electronic device 50B) is associated with CPE 30B, the base station 10 forwards the message to CPE 30B by sending a downlink unicast message, without accessing the network router 20. The base station 10 refers to the look-up table 12 to locate switching information and re-encapsulates the message. Referring briefly to the look-up table 12 in FIG. 3, the base station 10 is operable to locate the device entry 302B for the electronic device 50B and then to locate the associated CPE MAC address 350 for forwarding the message. Once received, the recipient CPE 30B strips the wireless header and forwards the message to the intended electronic device 50B via the router/L2 switch 40B in the second communication standard, in this embodiment Ethernet.

Figure 7:
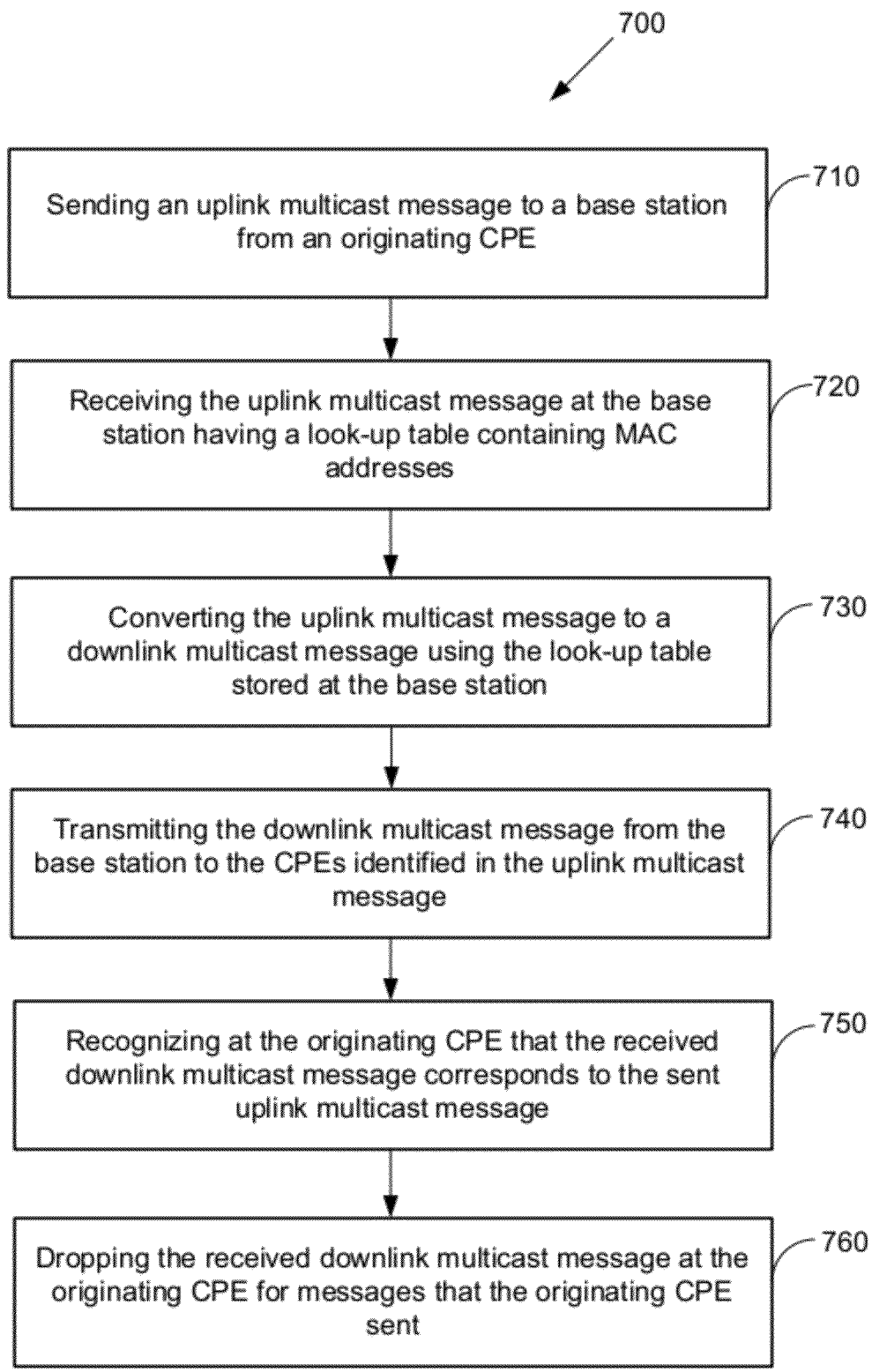
FIG. 7 is a method for wireless communicating multicast messages between a plurality of CPEs in accordance with an embodiment of the present invention.

Referring now to FIG. 7, a method 700 for wirelessly communicating multicast messages between a plurality of CPEs 30 is illustrated according to at least one embodiment of the present invention. With reference to FIG. 6A, the method uses the wireless communication system 100 to send an uplink multicast message to the base station 10 destined to a subset of the CPEs 30 in the wireless communication system 100, based on a group identifier. Each CPE 30 has a unique MAC address and the CPEs 30 and base station 10 are operable to communicate using a first communication standard that incorporates time division multiplexing over a wireless port. The base station 10 and the CPEs 30 are operable to send and receive wireless signals to each other utilizing a wireless interface 402 based on a TDM scheme, as defined by the first communication standard such as the WiMAX group of standards.

In BLOCK 710, an originating CPE 30 is operable to send an uplink multicast message to the base station 10 to be sent to other CPEs 30. For example, in FIG. 6A, the uplink multicast message shown generally by reference numeral 650m is sent to members of a virtual local area network (VLAN) or other CPE grouping as a multicast message. In some embodiments, as shown in FIG. 6A, the multicast message 650m may be sent by the originating electronic device 50a, which is operable to send an uplink multicast message to the base station 10 to be sent to other electronic devices 50 (or CPEs 30) via the base station 10.

The uplink multicast message 650m may include a group identifier identifying a group of CPEs to receive the uplink multicast message. In FIG. 6A, the electronic devices 50a and 50b associated with two CPEs 30A, 30B share the group identifier VLAN 10 and the electronic devices 50C, 50D associated with two different CPEs 30C, 30D share the group identifier VLAN 20.

In BLOCK 720, the base station 10 is operable to receive the uplink multicast message. The message is received over the first communication channel utilizing a TDM scheme.

In response to receiving the uplink multicast message, the base station 10, in BLOCK 730, is operable to convert the uplink multicast message 650m to a downlink multicast message using the look-up table 12 stored at the base station 10. As previously discussed, the base station 10 is operable to store a group identifier 330, such as a VLAN, for uniquely identifying a group of CPEs 30 and/or a group of devices 50. The base station 10 may use this group identifier 330 for determining where to forward the uplink multicast message. If a message from a given electronic device 50a, and its associated CPE 30a, is multicast to its associated VLAN (i.e. VLAN 10), the base station 10 is able to associate the group identifier 330 with specific CPEs 30 and electronic devices 50 associated with the group identifier 330 based on information contained within the look-up table 12.

In BLOCK 740, the base station 10 transmits the downlink multicast message to the CPEs 30, where each CPE 30 has its MAC address stored in the look-up table 12. The base station 10 will create a multicast service flow which will send the message to the identified CPEs 30 and/or electronic devices 50 identified in the multicast message 650m. If the multicast message identifies all of the electronic devices 50 in a VLAN, such as VLAN 10, the multicast service flow is created inherently as a part of the VLAN in the base station 10.

In some embodiments, the downlink multicast message is sent to all of the CPEs 30 in wireless communication system 100, including the originating CPE. In other embodiments, the downlink message is sent to a single CPE 30 or a subset of all the CPEs 30 associated or registered with the base station 10. It is understood that while the examples are given with respect to the multicast messages 650m originating from a device 50a, the invention would work equally if the multicast message 650m originated from a CPE 30 as shown in FIG. 5B.

The look-up table 12 stored on the base station contains the MAC addresses of each of the CPEs 30 associated or registered with the base station 10. When an uplink message is destined for more than one CPE 30 registered with the base station 10, the downlink message may be sent in a single information burst according to the time division multiplexing scheme. For example, the downlink message may be sent in a single TDM timeslot that is assigned to the intended group of CPEs 30, such as a multicast service flow as described herein. The group of CPEs 30 may be assigned to the timeslot provided by the scheduling algorithm associated with the first communication standard (i.e. the WiMAX group of standards). Such an approach incorporating the TDM functionality of the first communication channel allows the base station 10 to send multicast messages efficiently, with reduced end-to-end latency.

In some embodiments, where the originating CPE 30A or electronic device 50A is sending a multicast message to a member of a VLAN which it is not a member (e.g. electronic device 50C, part of VLAN 20), the base station 10 may not automatically forward the message to its intended recipient, even if it already has switching information stored within the look-up table 12. Instead, the base station 10 may forward the message to the router 20. This feature may enhance efficiency and security, as the base station 10 is capable of efficiently forwarding messages within the same broadcast domain, while simultaneously separating disparate parts (VLANS) of the network. In this manner, the base station 10 is behaving as a L2 switch, and segregates the different VLANs into different broadcast domains. Furthermore, each logical port LPORT 510 shown in FIGS. 5A and 5B and communicating a specific CPE 30, may be part of a specific VLAN. In other words, when communication to a VLAN that has devices 50 connected to CPE1 and CPE 3 of FIG. 5A, for example, the base station may communicate on both LPORT1 and LPORT3, based on the group identifier 330 and associated CPE MAC addresses 350 stored in look-up table 12 to decrease bandwidth and processing time.

Referring now to FIG. 6B which illustrates topology 600B, the electronic devices 50, associated with one or more CPEs 30, may be organized by group identifier shown generally by reference numeral 330 in FIG. 3, irrespective of how they are connected to the network. For example, electronic devices 50A, 50B, 50C, 50D may be part of different group identifiers 330, shown in FIG. 6B as being part of different VLANs 10 and 20, even if they are connected to the base station 10 via the same CPEs 30A, 30B.

Accordingly, while in some embodiments, the electronic devices 50 for a specific group identifier 330 may be segregated according to the associated CPE 30, this is not required. In one embodiment, every electronic device 50, associated with every CPE 30 in range or connected to a base station 10, may be associated with the same group identifier 330. Furthermore, a CPE 30 may have one, many or no group identifiers 330 associated with the electronic devices 50, associated with the CPE 30. Each CPE 30 associated with a wireless communication system 100, may have different group identifiers for groups of electronic devices 50 associated with that particular CPE 30. Different combinations of group identifiers shared between CPEs 30 and electronic devices 50 are possible.

For example, in FIG. 6B, another network topology 600B is shown having an electronic device 50A, associated with VLAN 10, and an electronic device 50B, associated with VLAN 20, are both associated with the same CPE 30A. Similarly, an electronic device 50C, associated with VLAN 20, and an electronic device 50D, associated with VLAN 10, both of which are associated with the same CPE 30B. Other electronic devices 50 (not shown), associated with other CPEs 30 (not shown), may also be associated with either VLAN 10 or VLAN 20.

An electronic device 50 is operable to send a multicast message to a group of electronic devices 50 (or CPEs 30), even if the electronic device 50 is not associated with the same CPE 30, by uniquely identifying the group of electronic devices 50 (or CPEs 30) by using the associated group identifier 330. Any one of the CPEs 30 in the group is operable to specify the group of CPEs 30 or electronic devices 50 to receive the multicast message 650 by placing the corresponding group identifier 330 in the uplink multicast message.

When an uplink multicast message 650 is sent by an electronic device 50A associated with a CPE 30A, the uplink multicast message 650 is sent by the CPE 30A to the base station 10 over the first communication channel. The originating electronic device 50A or CPE 30A can specify the group of CPEs 30 to receive the multicast message by placing the corresponding group identifier 330 in the uplink multicast message. In BLOCK 750, the base station 10 may transmit the downlink multicast message to the group of CPEs 30, identified by the group identifier 330.

The base station may send the downlink multicast message in a single information burst, including to the CPE 30A or electronic device 50A that originally sent the uplink multicast message. The single information burst may occur over a single TDM timeslot. In other embodiments, the single information burst may occur over a number of sequential timeslots. In any event, the downlink multicast message 650 is sent to the CPEs simultaneously and is received by the appropriate recipient CPEs at the same time, based on the group identifier.

As illustrated in FIG. 7, in BLOCK 760, when the originating CPE 30a or electronic device 50a that sent the uplink multicast message recognizes that the downlink multicast message corresponds to the uplink multicast message that it sent, the originating CPE 30A or electronic device 50A may drop the received downlink multicast message. In this manner, the originating CPE 30 is operable to send a multicast message 650 to the entire group identified by the group identifier 33 in the message 650 and the base station 10 can send the downlink multicast message in a single information burst or TDM timeslot without having to make any modifications to the downlink message. Instead, the message may be sent to the entire group of CPEs, with the originating CPE operable to recognize that a message that it has received from the base station 10 corresponds to the uplink multicast message 650 that it sent and take appropriate action. For example, the originating CPE may drop the downlink multicast message as illustrated in FIG. 5B and discussed above and also shown in BLOCK 760 of FIG. 7. In other words, the base station 10 will create a multicast service flow to send the downlink message to all the devices 50 and CPEs 30 in VLAN 10 in FIG. 6A, including the originating device 50a, because this saves processing time and bandwidth. The originating device 50a will then recognize that the received downlink message corresponds to the sent uplink multicast message 650m and disregard or drop the downlink message as discussed above with respect to FIG. 5B and shown in BLOCKS 750 and 760 in FIG. 7. It is understood that while examples are given with respect to multicast messages 650m originating from a device 50a, the invention would work equally well if the multicast message 650m originated from a CPE 30 as referred to in FIG. 7.

In some embodiments, a CPE 30 may recognize that the downlink multicast message it has received from the base station 10 does not need to be forwarded to any electronic devices 50 associated with the CPE 30, as the only electronic device 50 associated with the group identifier is the originating electronic device, which sent the uplink multicast message in the first instance. For example, in FIG. 6B, if the CPE 30a recognizes that there are no additional electronic devices 50 other than the originating electronic device 50b associated with the specified group identifier VLAN 10, the CPE 30a may be operable to drop the downlink multicast message, completely. Alternatively, if there is more than one electronic device 50 associated with specified group identifier VLAN 10, associated with the CPE 30a, the CPE 30a may drop the downlink multicast message for the originating electronic device 50b, only, and forward the downlink multicast message to the non-originating electronic devices (not shown). In alternate embodiments, the CPE 30a may continue to forward the downlink multicast message to all the electronic devices 50b associated with the CPE 30a and group identifier VLAN 10, and allow the originating electronic device 50b to drop the downlink multicast message, itself.

Referring now to FIG. 6C, yet another network topology 600C is depicted illustrating two base stations 10 having a plurality of electronic devices 50 associated with one or more CPEs 30. The base stations 10 are connected to each other through a network switch 22, such as for example, an Ethernet switch complying with the IEEE 802.3 (Ethernet) series of standards. When messages are destined for CPEs 30 or electronic devices 50 associated with the same group identifier, the base stations 10 and network switch 22 are able to work together to forward the uplink multicast messages without accessing the router 20.

As a layer 2 (L2) device in the Open Systems Interconnection model (OSI model), the network switch 22 is operable to learn the MAC addresses of devices connected to the network switch's 22 physical Ethernet ports (not shown). In order to support L2 tagged multicast traffic, the wireless communication system 100 is operable to define the relevant VLANs and associate the relevant CPEs 30 with each VLAN. No extra configuration or provisioning is required, as the multicast service flow is created inherently as part of VLAN creation in the base station 10.

Furthermore, no signaling is involved or required. Once tagged traffic is recognized as multicast traffic according to the required message frame structure incorporating the group identifier, the tagged traffic is replicated and sent to all the CPEs 30 that are subscribed to the VLAN. Accordingly, once associated with a specific VLAN, tagged traffic specific to that VLAN will be associated with the relevant multicast service flow.

In situations where the message is untagged, the L2 message may be forwarded to all the CPEs 30 within the wireless communication system 10 over a broadcast connection. For the wireless communication system 100 to act in multicast mode, ensuring that a multicast message reaches every possible electronic device 50 or CPE 30 associated with a group identifier, every CPE 30 in the wireless communication system 100 with members associated with the group identifier must be in the look-up table 12 stored in the base station 10. Alternatively, the group identifier will not be recognized by the base station 10 at all (i.e., no base station 10 with either an electronic device 50 or CPE 30 is indexed in the look-up table 12). In this manner, when receiving an uplink multicast message, the base station 10 will correctly forward the multicast message to all the base stations 10 having members associated with the group identifier or will not recognize the group identifier at all, and will resort to broadcasting the uplink multicast message to all network devices 30, 50. Any sites not indexed with the base station 10 receiving the uplink multicast message will not receive the multicast message.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It is understood that reference has been made throughout the disclosure and claims to the MAC address for various electronic devices including the consumer premises equipment. It is understood that the MAC address is being used as a unique identifier for the corresponding electronic device. However, the invention is not limited to use of the MAC addresses for this purpose. Rather, any unique identifier can be used as an address to uniquely identify the CPEs and other electronic devices and it is understood that the invention is not limited to use of MAC addresses for this purpose.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

What is claimed is:

1. A wireless communication system comprising:
   a plurality of consumer premises equipments (CPEs) for sending and receiving wireless signals in a first communication standard using time division multiplexing (TDM), each CPE having a unique MAC address;
   a base station having a wireless port for sending and receiving wireless signals to each of the plurality of CPEs in the first communication standard and using TDM, said base station having stored therein a look-up table containing the MAC addresses of the plurality of CPEs,
      the base station being configured to monitor messages received by the base station for forwarding by the base station, and to populate the look-up table with a MAC address identifying a CPE, the MAC address comprising either a destination MAC address or a source MAC address of a message received by the base station for forwarding to the destination MAC address;
   wherein any one of the plurality of CPEs can uplink a multicast message to the base station to be sent to the CPEs; and
   wherein in response to receiving the uplink multicast message, the base station sends a downlink multicast message to the CPEs having their MAC addresses stored in the look-up table and identified in the uplink multicast message.

2. The system of claim 1 wherein the base station sends the downlink multicast message to the CPEs having their MAC addresses stored in the look-up table in a single information burst.

3. The system of claim 1 wherein the base station sends the downlink multicast message to the CPEs having their MAC addresses stored in the look-up table in a single TDM timeslot.

4. The system of claim 1 wherein the base station creates a multicast service flow to send the downlink multicast message in a single information burst to the CPEs identified in the uplink multicast message.

5. The system of claim 1 wherein the base station transmits the downlink multicast message, in a single information burst, to all of the CPEs having their MAC addresses stored in a look-up table including the one of the plurality of CPEs that originated the uplink multicast message.

6. The system as defined in claim 5 wherein when the originating CPE that sent the uplink multicast message recognizes that the downlink multicast message corresponds to the uplink multicast message that it sent, the originating CPE drops the received downlink multicast message.

7. The system as defined in claim 1 wherein the base station further comprises a group identifier for each CPE, said group identifier uniquely identifying a group of CPEs; and wherein the any one of the originating CPEs can specify a group of CPEs to receive the multicast message by placing the corresponding group identifier in the uplink multicast message.

8. The system of claim 7 wherein the base station transmits the downlink multicast message to the group of CPEs identified by the group identifier in the single information burst, including the one of the plurality of CPEs that originated the uplink multicast message.

9. The system as defined in claim 8 wherein when the originating CPE recognizes that the downlink multicast message corresponds to the uplink multicast message that it sent, the originating CPE drops the received downlink multicast message.

10. The system of claim 7 wherein the base station creates a multicast service flow to send the downlink multicast message in a single information burst to the CPEs identified by the corresponding group identifier.

11. The system as defined in claim 7 wherein at least one CPE has one or more electronic devices associated therewith, and, each electronic device has a MAC address uniquely identifying the electronic device associated with the CPE.

12. The system as defined in claim 11 wherein the look-up table stored in the base station further contains the MAC address of each electronic device and its associated CPE.

13. The system as defined in claim 11 wherein the electronic devices communicate with the CPE using a second communication standard selected from the group of communication standards consisting of IEEE 802.11, IEEE 802.3 and IEEE 802.1Q.

14. The system as defined in claim 11 wherein at least one electronic device associated with a CPE has a different group identifier than another one of the electronic devices associated with the same CPE.

15. The system as defined in claim 1 wherein the monitored messages are either received or forwarded on the wireless port in the first communication standard.

16. The system as defined in claim 1 wherein the base station has a second port for sending and receiving signals in a second communication standard; and
   wherein the base station monitors the messages to and from the second port and the wireless port to populate the look-up table.

17. The system as defined in claim 16 wherein the second port is a wired port and the second communication standard is selected from the group of wired communication standards consisting of IEEE 802.3 (Ethernet), IEEE 802.1Q (VLAN Tagging).

18. The system as defined in claim 1 wherein the first communication standard complies with the IEEE 802.16 Standard (WiMAX).

19. A method of wirelessly communicating multicast messages between a plurality of consumer premises equipment (CPEs) in a first communication standard using Time Division Multiplexing (TDM), each of said CPEs having a unique MAC address, said method comprising:
   monitoring, by a base station, messages received by the base station for forwarding by the base station, the base station having stored therein a look-up table containing the MAC addresses of the plurality of CPEs, the base station having a wireless port for sending and receiving wireless signals to each of the plurality of CPEs in the first communication standard and using TDM:

populating, by the base station, the look-up table with a MAC address identifying a CPE, the MAC address comprising either a destination MAC address or source MAC address of a message received by the base station for forwarding to the destination MAC address;

sending, from an originating CPE of the plurality of CPEs, an uplink multicast message to the base station;

receiving, at the base station, the uplink multicast message;

converting, at the base station, the uplink multicast message to a downlink multicast transmit message using the look-up table stored at the base station; and transmitting, by the base station, the downlink multicast message to the CPEs having their MAC addresses stored in the look-up table and identified in the uplink multicast message.

20. The method of claim 19 wherein the step of transmitting, by the base station, the downlink multicast message to the plurality of CPEs, includes transmitting the downlink multicast message to all of the CPEs having their MAC addresses stored in a look-up table including the originating CPE.

21. The method as defined in claim 20 further comprising: recognizing, at the originating CPE, that the downlink multicast message corresponds to the uplink multicast message previously sent by the originating CPE; and dropping, by the originating CPE, the received downlink multicast message.

22. The method as defined in claim 19, wherein the monitored messages are either received or forwarded on the wireless port in the first communication standard.

23. The method as defined in claim 19 wherein the base station comprises a wired port for sending and receiving signals in a second communication standard; and the base station monitors the messages sent and received on the wireless port and the wired port to populate the look-up table.

24. The method as defined in claim 19 wherein the look up table stored at the base station comprises a group identifier for each CPE, said group identifier uniquely identifying a group of CPEs; and wherein the originating CPE can specify a specific group of CPEs to receive the multicast message by placing the corresponding group identifier in the uplink multicast message.

25. The method as defined in claim 24 wherein at least one CPE has one or more electronic devices associated therewith, each electronic device having a MAC address uniquely identifying the electronic device associated with the CPE.

26. The method of claim 25 wherein at least one electronic device associated with a CPE has a different group identifier than another one of the electronic devices associated with the same CPE.

27. The method as defined in claim 23 wherein the second wired communication standard is selected from the group consisting of IEEE 802.3 (Ethernet), IEEE 802.1Q (VLAN Tagging).

* * * * *